(12) United States Patent
Petrovic et al.

(10) Patent No.: US 9,181,857 B2
(45) Date of Patent: *Nov. 10, 2015

(54) METHOD FOR OPERATING A TURBOCHARGER ARRANGEMENT AND CONTROL UNIT FOR A TURBOCHARGER ARRANGEMENT

(75) Inventors: Simon Petrovic, Aachen (DE); Alain Marie Roger Chevalier, Henri-Chapelle (BE); Arno Bartsch, Maastricht (NL)

(73) Assignee: Ford Global Technologies, LLC, Dearborn, MI (US)

( * ) Notice: Subject to any disclaimer, the term of this patent is extended or adjusted under 35 U.S.C. 154(b) by 373 days.

This patent is subject to a terminal disclaimer.

(21) Appl. No.: 13/399,889

(22) Filed: Feb. 17, 2012

(65) Prior Publication Data

US 2012/0210711 A1    Aug. 23, 2012

(30) Foreign Application Priority Data

Feb. 21, 2011   (EP) .................................... 11155170

(51) Int. Cl.
    *F02B 37/18*    (2006.01)
    *F02B 37/013*    (2006.01)
    (Continued)

(52) U.S. Cl.
    CPC ............ *F02B 37/013* (2013.01); *F02B 37/002* (2013.01); *F02B 37/16* (2013.01); *F02B 37/18* (2013.01); *F02B 39/16* (2013.01); *F02D 41/0007* (2013.01); *F02D 41/221* (2013.01); *F02B 2039/164* (2013.01);
    (Continued)

(58) Field of Classification Search
    CPC ........... F02B 2039/168; F02D 41/1445; F02D 41/1448; F02D 41/18; F02D 2200/0406; F02D 41/0007; F02D 41/221; F02D 2200/0414; F01N 2900/1406; F01N 2900/1411; Y02T 10/40; Y02T 10/144
    USPC ................ 60/602, 611, 612, 605, 1; 123/562; 73/114.06, 114.69, 114.76
    See application file for complete search history.

(56) References Cited

U.S. PATENT DOCUMENTS 5,987,888 A * 11/1999 Weisman et al. ................ 60/612
6,055,812 A *  5/2000 Trumbower ................... 60/612
(Continued)

FOREIGN PATENT DOCUMENTS

DE    102008018133 A1 *  3/2010 .............. F02B 39/16
FR    2937379 A1    4/2010
(Continued)

OTHER PUBLICATIONS

Translation for DE 102008018133 A1.*
(Continued)

*Primary Examiner* — Thai Ba Trieu
*Assistant Examiner* — Jason T Newton
(74) *Attorney, Agent, or Firm* — Julia Voutyras; Alleman Hall McCoy Russell & Tuttle LLP

(57) ABSTRACT

A method for operating a turbocharger arrangement of an internal combustion engine, the turbocharger arrangement comprising a low-pressure and a high-pressure turbocharging stage arranged sequentially, the high-pressure turbocharging stage comprising a high-pressure compressor with a sensorless compressor bypass valve, comprises evaluating at least one sensor signal of the turbocharger arrangement for detecting a failure mode of the compressor bypass valve.

15 Claims, 7 Drawing Sheets

(51) Int. Cl.
*F02B 37/16* (2006.01)
*F02B 39/16* (2006.01)
*F02D 41/00* (2006.01)
*F02D 41/22* (2006.01)
*F02B 37/00* (2006.01)
*F02D 41/18* (2006.01)

(52) U.S. Cl.
CPC .... *F02B 2039/166* (2013.01); *F02B 2039/168* (2013.01); *F02D 41/18* (2013.01); *F02D 2200/0406* (2013.01); *F02D 2200/0414* (2013.01); *Y02T 10/144* (2013.01); *Y02T 10/40* (2013.01)

(56) References Cited

U.S. PATENT DOCUMENTS

| | | | |
|---|---|---|---|
| 7,926,335 B2* | 4/2011 | Wegener et al. | 73/114.79 |
| 2004/0216519 A1* | 11/2004 | Baeuerle | 73/118.1 |
| 2007/0289302 A1* | 12/2007 | Funke et al. | 60/602 |
| 2009/0082936 A1* | 3/2009 | Andreae et al. | 701/102 |
| 2010/0180590 A1* | 7/2010 | Andreae et al. | 60/600 |
| 2011/0036086 A1* | 2/2011 | Liu et al. | 60/602 |
| 2011/0154892 A1* | 6/2011 | Ibuki et al. | 73/114.79 |
| 2012/0191321 A1* | 7/2012 | Ibuki et al. | 701/102 |
| 2014/0041384 A1* | 2/2014 | Mischler et al. | 60/605.2 |
| 2014/0214302 A1* | 7/2014 | Parikh et al. | 701/101 |

FOREIGN PATENT DOCUMENTS

| | | | | |
|---|---|---|---|---|
| JP | 4017723 A1 | | 1/1992 | |
| JP | 4047125 A | | 2/1992 | |
| JP | 2002047958 A | * | 2/2002 | F02B 39/16 |
| JP | 2005226501 A | * | 8/2005 | F02B 39/16 |
| JP | 2006046246 A | * | 2/2006 | F02B 39/16 |
| JP | 2008297994 A | | 12/2008 | |
| JP | 2009162124 A | * | 7/2009 | F02B 39/16 |
| JP | 2009185684 A | * | 8/2009 | F02B 39/16 |
| JP | 2010216402 A | | 9/2010 | |
| WO | 2011007455 A1 | | 1/2011 | |

OTHER PUBLICATIONS

Translation for JP 2005226501 A.*
Translation for JP 2002047958 A.*
Translation for JP 2006046246 A.*
Translation for JP 2009185684 A.*
ISA European Patent Office, Search Report of EP 11155170.1, Jun. 15, 2011, Netherlands, 6 pages.

* cited by examiner

METHOD FOR OPERATING A TURBOCHARGER ARRANGEMENT AND CONTROL UNIT FOR A TURBOCHARGER ARRANGEMENT

CROSS REFERENCE TO RELATED APPLICATIONS

This application claims priority to European Patent Application No. 11155170.1, entitled "Method for Operating a Turbocharger Arrangement and Control Unit for a Turbocharger Arrangement", filed Feb. 21, 2011, which is hereby incorporated by reference in its entirety for all purposes.

BACKGROUND

Internal combustion engines, in particular diesel and gasoline engines, are frequently equipped with turbochargers. Generally, turbochargers are driven by and placed in the exhaust flow of an internal combustion engine. The exhaust flow and/or the intake airflow are controlled by one or more bypass valves located in branches of the exhaust and/or intake system, and ensure that various constraints are respected, including exhaust composition, compressor outlet temperature and turbine inlet temperature, as well as avoiding turbocharger surge or overspeed. Bypass valves that are actively controlled usually have a default or "failsafe" position into which they move when there is no vacuum or electrical supply. The failsafe position normally is either fully open or fully closed. The default setting is determined by factors such as safety and engine power requirements at altitude. However, the compressor bypass valve may also fail and become stuck, for example, in the fully closed or fully open position. It would be desirable to detect such failure of the compressor bypass valve without a position feedback sensor and its associated increased cost and complexity.

SUMMARY

A method for operating a turbocharger arrangement of an internal combustion engine and a control unit for such a turbocharger arrangement is disclosed. The internal combustion engine includes a multi-stage sequential turbocharger arrangement comprising a low-pressure stage and a high-pressure stage. The exhaust flow and/or the intake airflow of the internal combustion engine are controlled by one or more bypass valves located in branches of the exhaust and/or intake system, which are parallel to the respective turbocharger's turbine and/or compressor. The bypass valves are passive in order to reduce cost and complexity, and open or close due to pressure differences across them. Without active control or a position feedback sensor, other sensors are provided in a plurality of locations in the engine to measure signals and parameters affected by bypass valve operation. Signals and/or parameters may include mass airflow, boost pressure, interstage temperature and post-compressor temperature.

A method for compensating for bypass valve failure is further provided. A control unit coupled by links to a plurality of sensors may receive measurements and determine the state of bypass valve operation. The control unit can then manage the overall operation of the turbocharger arrangement by manipulating component actuators. Thus, in the event of bypass valve failure, the control unit may compensate and preserve normal engine operation.

DETAILED DESCRIPTION

Figure 1:
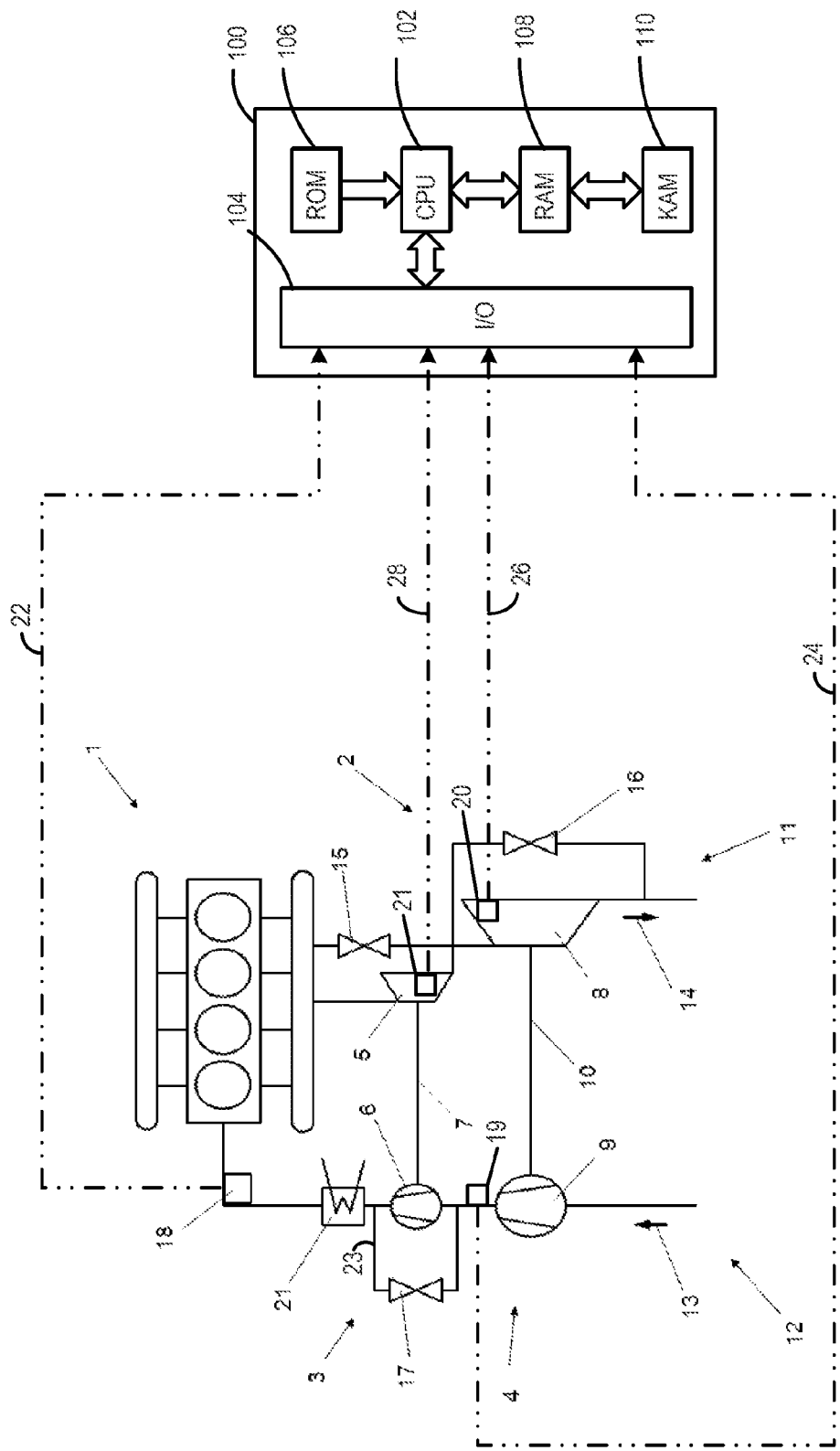
FIG. 1 shows a portion of an internal combustion engine comprising turbochargers, a compressor bypass valve, a control unit and a plurality of links between sensors and the control unit.

In the embodiment shown schematically in FIG. 1, an internal combustion engine 1 exhibits a multi-stage sequential turbocharger arrangement 2 comprising a high-pressure turbocharger 3 and a low-pressure turbocharger 4. The high-pressure turbocharger 3, utilized for fulfilling back pressure requirements for driving exhaust gas recirculation, comprises a high-pressure turbine 5 and a high-pressure compressor 6, the compressor 6 being driven by the turbine 5 via a drive shaft 7. The low-pressure turbocharger 4, utilized for peak power, comprises a low-pressure turbine 8 driving a low-pressure compressor 9 by means of a drive shaft 10. Turbines 5 and 8 are arranged sequentially in the exhaust system 11 of the internal combustion engine, the high-pressure turbine 5 being arranged upstream the low-pressure turbine 8, i.e. in a section with higher pressure. Correspondingly, compressors 6 and 9 are arranged sequentially in the intake system 12 of the engine 1, the high-pressure compressor 6 being located downstream the low-pressure compressor 9. The direction of airflow in the intake system 12 and the direction of exhaust flow in the exhaust system 11 are indicated by the arrows 13 and 14, respectively. Intercooler 21 is included downstream the HP compressor. Generally, the high-pressure turbine 5 and the high-pressure compressor 6 are smaller than the low-pressure turbine 8 and the low-pressure compressor 9, respectively. This is indicated symbolically in FIG. 1.

A high-pressure turbine bypass valve 15 (TBV) is arranged in a parallel branch of the exhaust system parallel to the high-pressure turbine 5. Therefore, a full or partial opening of the high-pressure TBV 15 creates a bypass for the exhaust flow to partially or completely bypass the high-pressure turbine 5. If the exhaust flow partially or completely passes through the bypass valve 15, the high-pressure turbine 5 is consequently driven at a reduced rate. The operation of the high-pressure turbocharger 3 can thus be controlled by the operation of the TBV 15. In a similar manner, a low-pressure TBV 16 is arranged in a parallel branch of the exhaust system 11 parallel to the low-pressure turbine 8. The low-pressure TBV 16 is also denoted "wastegate" (WG). The WG 16 is actively operated, serving as an actuator, and may or may not comprise a position feedback sensor.

In the intake system 12, the intake air flows through the low-pressure compressor 9, being compressed in a first stage of compression. Thereafter, the intake air flows through the high-pressure compressor 6 representing a second stage of compression, or through a parallel branch arranged parallel to the high-pressure compressor 6. The parallel branch can be opened or closed by a compressor bypass valve 17 (CBV). The CBV 17 is passive, i.e. operated by the pressure difference acting across it, and does not comprise a position feedback sensor. In particular, the CBV 17 has only two positions, which are fully open and fully closed.

The state of the compressor bypass valve 17 has a direct or indirect influence on a variety of parameters governing the operation of the turbocharger arrangement 2. For example, the pressure ratio provided by the high-pressure compressor 6 and the mass flow through the intake system 12 are considerably altered due to opening or closing the CBV 17. In addition, the speed of the high-pressure turbocharger 3, the boost pressure provided by the turbocharger arrangement 2 and a number of further parameters are influenced by the function of the CBV 17. Consequently, such parameters can be employed for detecting a failure of the CBV 17.

The intake air mass flow, the boost pressure and/or the compressor outlet temperature may be measured by a downstream sensor 18 shown symbolically in FIG. 1. In this example, the downstream sensor 18 is located downstream the high-pressure compressor 6 as well as the high-pressure compressor bypass branch 23. The downstream sensor 18, however, may be situated in other locations within the intake airway. Alternatively, additional sensors may be provided, and one for each quantity for which a measurement is desired may be included. The engine 1 may comprise further sensors, including an inter-stage sensor 19 located between the low-pressure compressor 9 and the high-pressure compressor 6 enabled to measure inter-stage boost pressure and/or temperature, a low-pressure turbocharger sensor 20 and a high-pressure turbocharger sensor 21. As before, two sensors may be provided in place of the inter-stage sensor 19, one each for measuring the inter-stage boost pressure and inter-stage temperature, respectively. Preferably, the post-compressor temperature is measured immediately downstream the high-pressure compressor 6. Both the low-pressure and high-pressure turbocharger sensors 20 and 21 are enabled to measure their respective turbocharger speeds, and may be placed in a number of locations with respect to their turbocharger, including at the turbine, compressor or drive shaft. Additionally or alternatively, the turbocharger speed can be measured by using the corresponding compressor map, if a sensor might not be available. The internal combustion engine 1 may be also equipped with an exhaust gas recirculation system, which is not shown in FIG. 1.

A plurality of sensor links 22, 24, 26 and 28 are shown in FIG. 1 which allow the transfer of measurements taken by sensors to a control unit 100 for processing and analysis. As previously disclosed, the engine 1 may comprise additional sensors in which case additional sensor links will be provided.

Control unit 100 is shown in FIG. 1 as a conventional microcomputer including: microprocessor unit 102, input/output ports 104, read-only memory 106, random access memory 108, keep alive memory 110 and a conventional data bus. Storage medium read-only memory 106 can be programmed with computer readable data representing instructions executable by processor 102 for performing the methods described below as well as other variants that are anticipated but not specifically listed. The control unit 100 further comprises output means for controlling the turbocharger arrangement 2 by operating the actuators of the low-pressure and high-pressure TBVs 15 and 16. The valves may be operated by vacuum or electrical signals. By controlling such actuators, the control unit 100 is capable of engaging a first and second control mode—one for nominal CBV operation and one for CBV failure. The control unit 100 may also comprise a signal output for a warning signal and a failure memory for storing information on the failure mode detected. The control unit may be part of an electronic control unit of the engine. The control unit 100 is shown in FIG. 1 receiving signals from the aforementioned sensors via the sensor links coupled to internal combustion engine 1.

Figure 2:
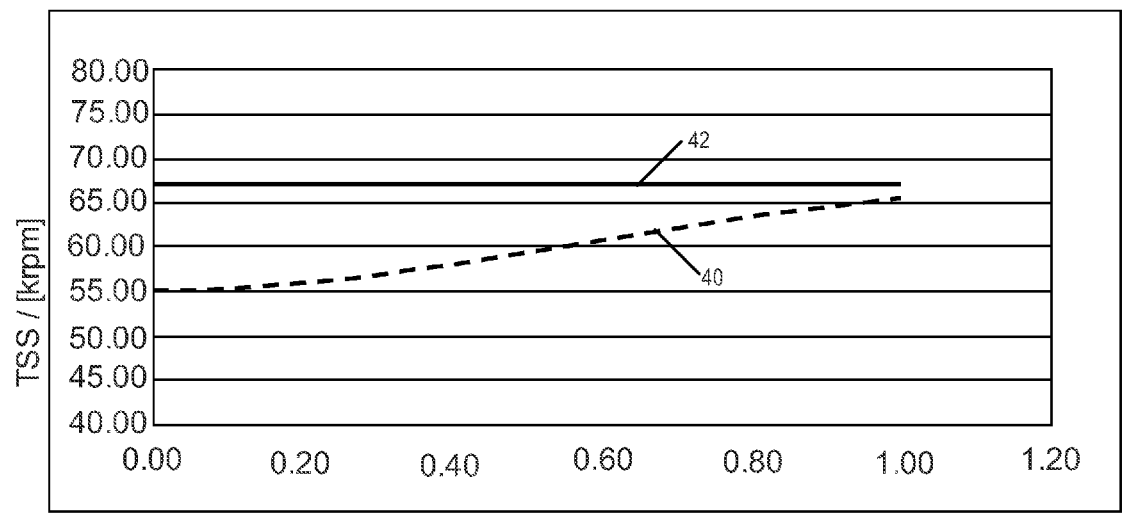
FIG. 2 shows a graphical representation of the dependence of turbocharger speed on the position of the compressor bypass valve in an exemplary case.

FIG. 2 shows an illustrative example of turbocharger speeds (in 1000 rotations per minute) for the high-pressure turbocharger 3 (curve 40) and for the low-pressure turbocharger 4 (curve 42) as a function of the position of the CBV 17, CBV_pos, which is given as a fraction of its full opening. As can be seen in FIG. 2, the speed 40 of the high-pressure turbocharger 3 significantly rises with the degree of opening of the CBV 17, while the speed 42 of the low-pressure turbocharger 4 is largely independent of the CBV opening. Conversely, the speed 40 of the high-pressure turbocharger 3 permits detecting the opening of the CBV 17. Although the CBV 17 usually has only two positions, FIG. 2 demonstrates that intermediate positions may also be determined in principle. Thus, if the CBV 17 is stuck in the fully open or in the fully closed position, or even in an intermediate position, this can be detected by measuring the rotational speed of the high-pressure turbocharger 3. In particular, a threshold can be set, the rotational speed exceeding the threshold indicating the CBV 17 being fully open, and the rotational speed being below the threshold indicating the CBV 17 being fully closed. In the example shown in FIG. 2 and for the set of parameters employed in that case, the threshold for distinguishing the fully closed and the fully open states of the CBV might be set at about 60,000 rpm.

FIG. 2 shows measurements made at a relatively low engine speed (2000 rpm). At that engine speed, the rotational speed of the high-pressure turbocharger 3 may allow reliable detection of a CBV failure. For a given compressor pressure ratio, the total mass air flow also allows determination of the CBV position as well. There may also be a small drop in the boost pressure due to an opening of the CBV 17. Other parameters, such as compressor efficiency, compressor outlet temperature or compressor pressure ratio, are less sensitive to the CBV state.

Figure 3:
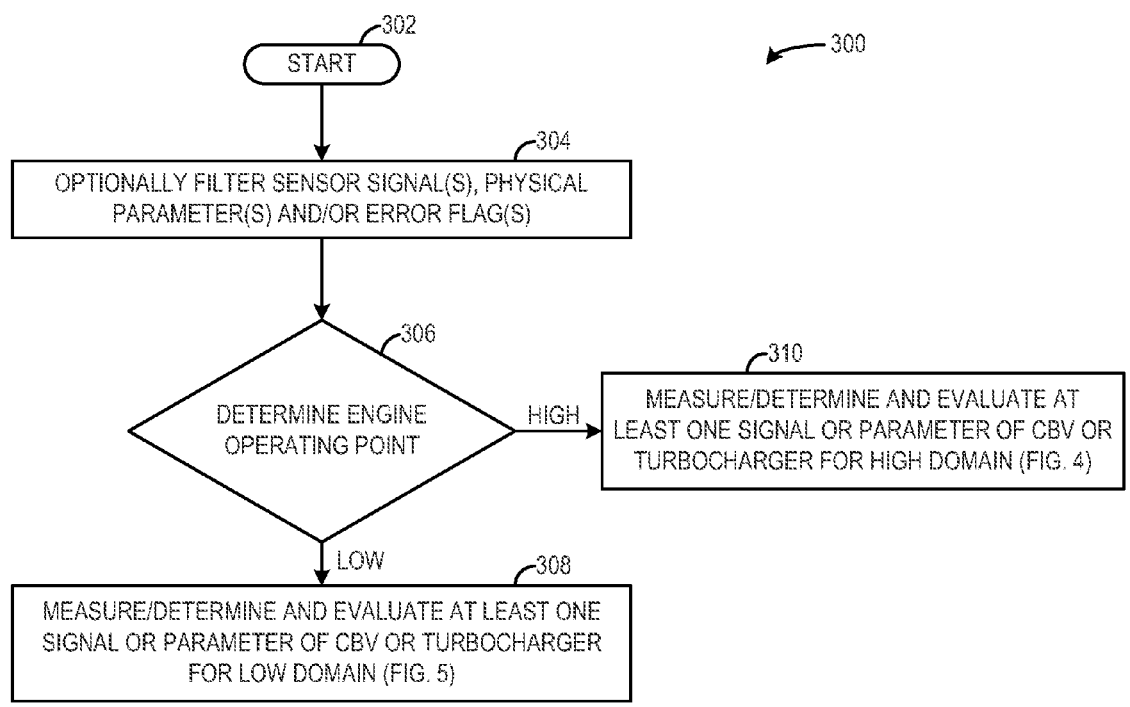
FIG. 3 shows the initial portion of a method for detecting failure of a compressor bypass valve.

FIG. 3 shows the initial portion of a method 300 for detecting failure of a CBV. At 302, the method begins and may be employed in real-time or at discrete intervals so that the CBV is continuously monitored to detect a failure as early as possible. The control unit 100 receives, via sensor links, at least one sensor signal indicative of the CBV 17 condition or turbocharger arrangement 2 from which it may derive physical parameters and/or error flags indicative of the turbocharger arrangement 2. Alternatively or additionally, appropriate sensors may be employed which provide physical parameters directly to the control unit, rather than signals requiring additional processing. Compared to the sensor signals, physical parameters may provide an increased magnitude of difference between the normal and failure CBV states, allowing for easier measurement with greater confidence. Examples of the sensor signals are described herein with regard to FIGS. 4 and 5.

At 304, the control unit 100 may filter the at least one sensor signal before determining whether or not the CBV 17 has failed. Filtering may include time-domain low-pass filtering, and serves to avoid false detection of a failure due to causes including noise or transition states when the CBV 17 changes its position from open to closed or vice versa. A physical parameter or function representative of the mode of operation of the CBV may be filtered as well. Such a function is derived by evaluating the at least one sensor signal and may be a parameter indicating the state of the CBV 17 or a parameter or error flag indicating failure of the CBV 17. In one embodiment, the function may employ the values 0 or 1, according to the valve state being fully closed or fully open, respectively, or a valve failure being detected or not.

At 306 the method determines the engine operating point, which may be characterized by the engine speed and/or load. The particular manner accounting for the engine operation point may depend on a calibration of the engine and the characteristics of the engine components and turbocharger arrangement 2. Determination of the engine operating point is included because the quantities measured and resulting actions differ among various operating points. If the engine is determined to be at a low operating point, i.e. at low speed and/or with a light load, the method proceeds accordingly to FIG. 4. Conversely, if the engine is operating a high speed and/or with a large load, the method proceeds accordingly to FIG. 5.

Figure 4:
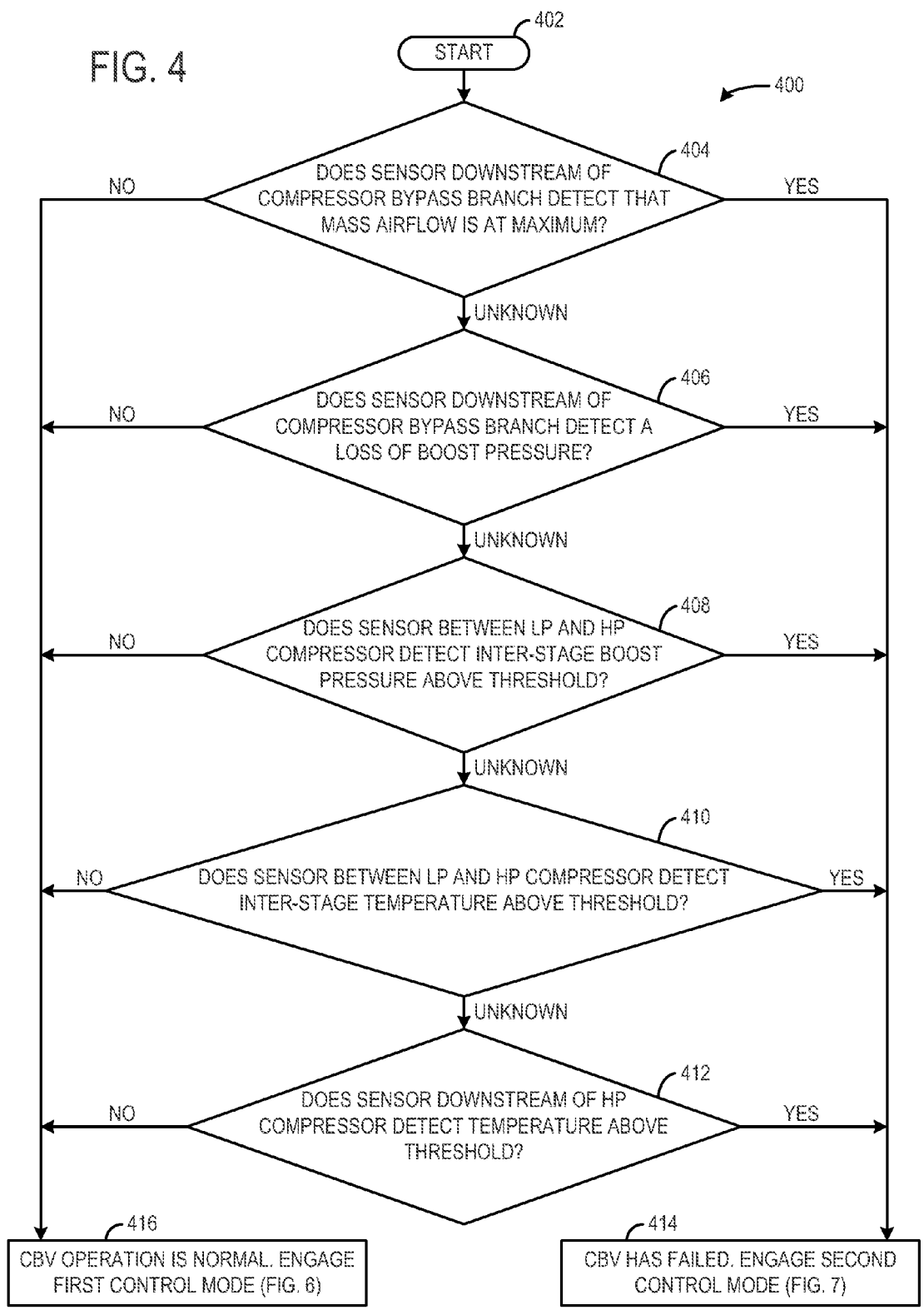
FIG. 4 shows a method for detecting failure of a compressor bypass valve in a high speed and/or torque domain.

If the engine operating point is high, the method continues at 402 as shown in FIG. 4. Due to the inclusion of various sensors, a plurality of signals and parameters may be available with which the method may evaluate the condition of the CBV 17. Certain signals and parameters, however, can be more sensitive to the CBV condition at particular operating points. At an engine speed of 3500 RPM, for example, mass airflow may be most sensitive to the CBV condition. Thus, at a high engine operating point, the method 400 first evaluates mass airflow at 404 with the downstream sensor 18. Prior to evaluation, mass airflow may be corrected for the airflow passing through the high-pressure compressor bypass branch (e.g. 23 in FIG. 1). If the control unit 100 determines that mass airflow is at maximum, i.e. flow is choked, CBV operation has most likely failed and the method proceeds to 414 to compensate for the failure. If flow is not choked, the method proceeds to 416 to ensure normal operation. In the embodiment shown in FIG. 4, the method provides an action if whether or not the mass airflow condition cannot be determined. In this case, the method proceeds to 406 where the next most preferred sensor signal or physical parameter is evaluated to determine CBV condition. Here, the method checks with downstream sensor 18 whether or not a loss of boost pressure occurred. In other embodiments, the method may proceed from 404 to 406 regardless of the outcome of 404, continuing on until the evaluation of all sensor signals and/or physical parameters is complete. Still further, only a subset of the available signals and/or parameters may be evaluated. In this embodiment, all possible data is considered so as to increase the confidence and validity of the evaluation of the CBV condition.

Assuming the method 400 has not conclusively evaluated the CBV condition, or has opted to measure further signals and/or parameters so as to increase confidence, the method continues to 408 wherein the inter-stage sensor 19 is used to evaluate the inter-stage boost pressure as well as the inter-stage temperature at 410. Threshold values for the inter-stage boost pressure and temperature set the boundary between nominal CBV operation and failure. Such values may be predetermined or calculated during engine operation.

At 412, the method similarly employs downstream sensor 18 to determine whether or not the temperature downstream of high-pressure compressor 6 has exceeded its respective threshold value. If one or all of the measured quantities at 408, 410 and 412 exceed their respective threshold values, the method proceeds to 414 wherein CBV failure is compensated for. If, on the other hand, the CBV is determined to be operating normally, the method 400 proceeds to 416 where a first control mode is engaged as shown in FIG. 6.

Figure 5:
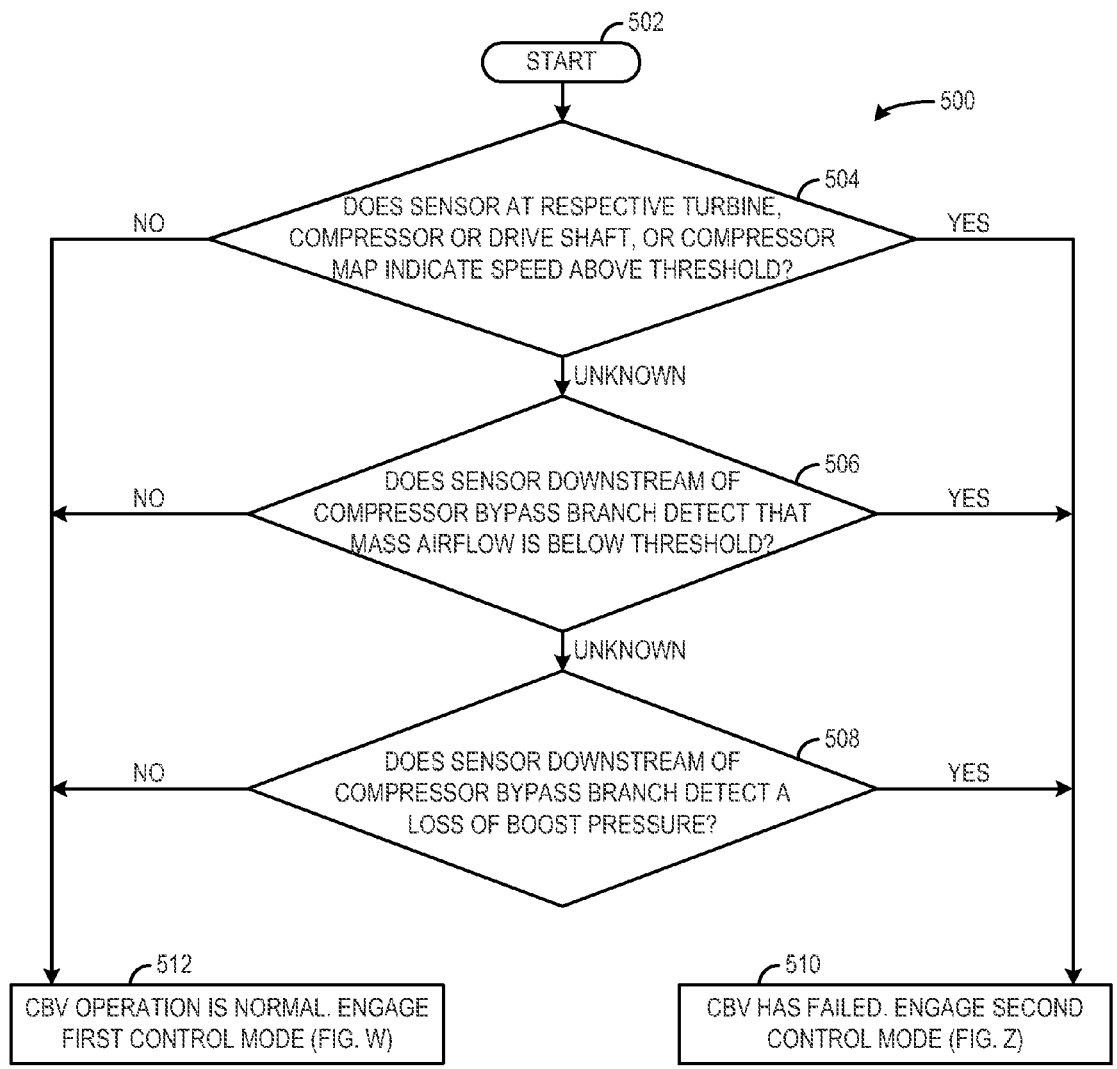
FIG. 5 shows a method for detecting failure of a compressor bypass valve in a low speed and/or torque domain.

If the engine operation point is low, i.e. the engine is operating at a low speed and/or with a light load, the initial method 300 proceeds from 310 to the method 500 shown in FIG. 5 to similarly determine the CBV condition.

At 502, the method for detecting CBV condition begins. The method 500 first evaluates at 504 the speed of the high-pressure turbocharger 3 with the high-pressure turbocharger sensor 21, which may be placed at its respective turbine, compressor or drive shaft. Alternatively or additionally, a compressor map may be used. As previously described, the method may proceed immediately to 510 or 512 and respond to the CBV condition, or the method may continue to 506 and then 508. At 506, the downstream sensor 18 is employed to detect whether or not mass airflow is below a threshold value. At 508, the downstream sensor 18 is also used to detect a loss of boost pressure. Note that in both low and high engine operating points a loss of boost pressure may be indicative of CBV failure. It will be understood that the sensor signals and physical parameters listed in the method in FIG. 5. are merely illustrative and should not limit in any sense the present disclosure. More specifically, additional sensor signals and/or physical parameters may be used to assess CBV condition than listed in FIG. 5, including inter-stage pressure, inter-stage temperature and post-compressor temperature.

Figure 6:
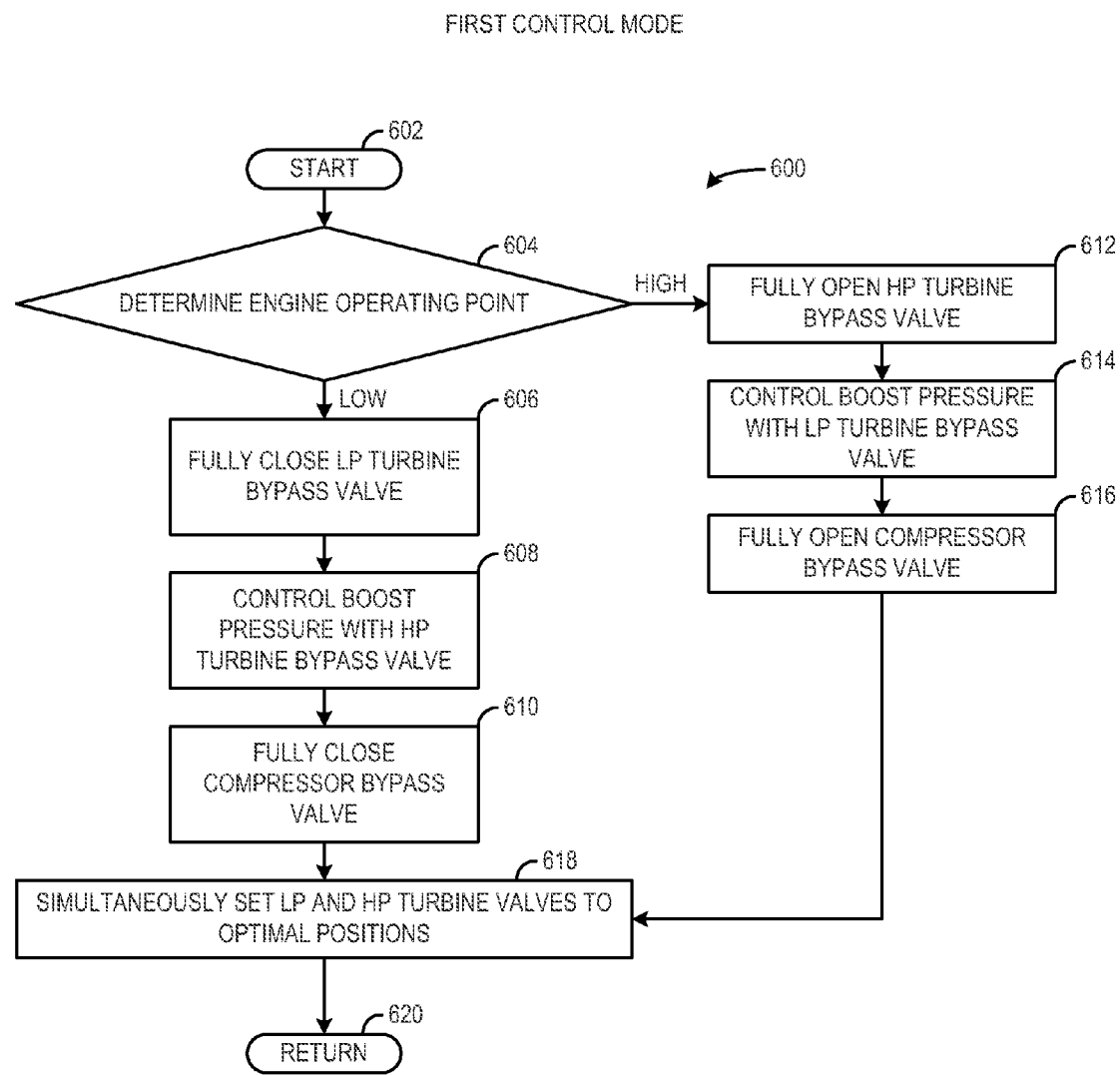
FIG. 6 shows a method of operating an internal combustion engine when a compressor bypass valve is functioning normally.

If, after completion of either methods 400 or 500, CBV operation is determined to be normal, a first control mode is engaged at 602, as shown in FIG. 6. At 604, the engine operating point is determined as at 306 in FIG. 3. For a low operating point, the method 600 proceeds to 606 wherein the low-pressure TBV is fully closed. Then, at 608, boost pressure is controlled with the high-pressure TBV. It will be appreciated, however, that other methods may be employed to control boost pressure. At 610, the CBV 17 is fully closed due to the pressure difference. At 618, the method 600 may optionally or alternatively set the low-pressure and high-pressure turbine valves to optimal positions, depending on the current engine and/or load and the current position of the CBV. Their positions may be intermediate positions between being fully closed and fully opened. This means that a closed-loop control employing both of the low-pressure and the high-pressure turbine valves is performed. In this way, optimal performance in the low-speed/torque domain can be provided, as well as the back pressure required for exhaust gas recirculation.

If the engine operating point is determined to be high, the method 600 proceeds from 604 to 612, wherein the high-pressure TBV is fully opened. Next, at 614, boost pressure is controlled with the low-pressure TBV, and at 616, the CBV is fully opened. In this manner, peak engine power may be provided. As stated previously, the method may optionally or alternatively set the low-pressure and high-pressure turbine valves to optimal positions, depending on the current engine and/or load and the current position of the CBV.

Figure 7:
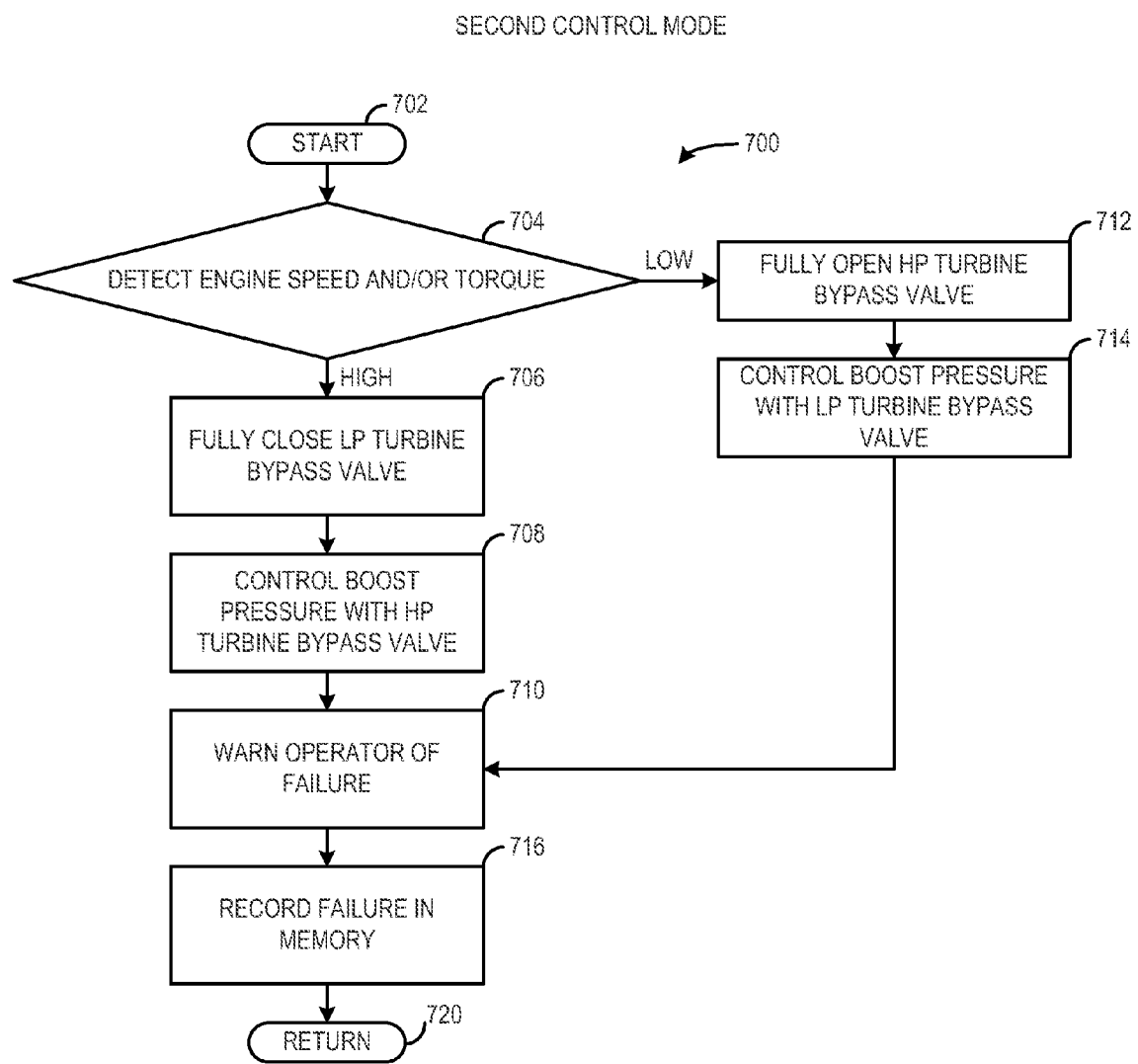
FIG. 7 shows a method of operating an internal combustion engine when a compressor bypass valve is malfunctioning.

If, at the end of either methods 400 or 500, the CBV is determined to have failed, operation proceeds to a second control mode as shown in FIG. 7. By engaging a second control mode, the engine may safely accommodate the failure and, in addition, may achieve a maximum in responsiveness and power and/or a minimum in pollutant emissions. The method 700 begins at 702 and determines the engine operating point at 704 as at 306 in FIG. 3. Should it be determined that the operating point is high, the method proceeds to 706 wherein the low-pressure TBV is fully closed. Boost pressure is then controlled at 708 with the high-pressure TBV. The vehicle operator at 710 is then warned of the failure via the input/output ports 104 of the control unit 100 (FIG. 1) and the failure may be recorded in the control unit 100's memory. At 720, the method completes and may return to 302 in FIG. 3 to repeat as necessary.

Conversely, if the engine operating point is determined to be low, the method 700 proceeds to 712 wherein the high-pressure TBV is fully opened. At 714, boost pressure is then controlled with the low-pressure TBV. The method then proceeds to 710 and 716 as before, notifying the vehicle operator of the failure and recording the failure in memory. At 720, the method completes and may return to 302 in FIG. 3 to repeat as necessary.

The invention claimed is:

1. A method for operating a turbocharged engine via an electronic control unit including non-transitory instructions stored in memory, the turbocharged engine comprising a low-pressure and a high-pressure turbocharging stage arranged sequentially, the high-pressure turbocharging stage comprising a high-pressure compressor with a passive, sensorless compressor bypass valve to bypass the high-pressure compressor, the method comprising:
   detecting a failure mode of the compressor bypass valve based on at least one sensor signal of the turbocharged engine, the at least one sensor signal including a signal from an inter-stage pressure sensor located upstream from a high-pressure compressor bypass line outlet and downstream from a low-pressure compressor inlet; and
   when the failure mode is detected, setting a first turbine bypass valve to a designated position and controlling boost pressure with a second turbine bypass valve.

2. The method according to claim 1,
   wherein the at least one sensor signal further includes a signal representative of intake mass airflow, boost pressure, inter-stage temperature, post-compressor temperature or turbocharger speed.

3. The method according to claim 2,
   wherein the at least one sensor signal is evaluated for determining at least one physical parameter of the turbocharged engine.

4. The method according to claim 3,
   wherein the at least one physical parameter of the turbocharged engine is compressor airflow, compressor pressure ratio, compressor efficiency or compressor outlet temperature.

5. The method according to claim 4,
   wherein the at least one sensor signal of the turbocharged engine comprises the signal from the inter-stage pressure sensor and the signal representative of inter-stage temperature, and wherein the at least one sensor signal is evaluated for detecting the failure mode of the compressor bypass valve depending on an engine operating point.

6. The method according to claim 1, further comprising operating the turbocharged engine according to a first control mode; and upon detection of the failure mode of the compressor bypass valve, operating the turbocharged engine according to a second control mode.

7. The method according to claim 6,
   wherein when the first control mode is a low-speed/torque control mode, the second control mode comprises setting the designated position of the first turbine bypass valve to fully open and controlling boost pressure with the second turbine bypass valve, the first turbine bypass valve being a high-pressure turbine bypass valve and the second turbine bypass valve being a low-pressure turbine bypass valve.

8. The method according to claim 6,
   wherein when the first control mode is a high-speed/torque control mode, the second control mode comprises setting the designated position of the first turbine bypass valve to fully closed and controlling boost pressure with the second turbine bypass valve, the first turbine bypass valve being a low-pressure turbine bypass valve and the second turbine bypass valve being a high-pressure turbine bypass valve.

9. A method of controlling a turbocharged engine via an electronic control unit including non-transitory instructions stored in memory, comprising:
   operating the turbocharged engine with a low-pressure turbocharger and a high-pressure turbocharger arranged sequentially, the high-pressure turbocharger comprising a compressor with a passive, sensorless compressor bypass valve (CBV);
   determining degradation of the CBV based on an operating parameter; and
   adjusting a turbine bypass valve in response to the determination of the degradation of the CBV.

10. The method according to claim 9, wherein the high-pressure and low-pressure turbochargers are operated according to a first control mode and upon the determination, the high-pressure and low-pressure turbochargers are operated according to a second control mode.

11. The method according to claim 10, wherein the first control mode is a low-speed/torque control mode and in the second control mode a high-pressure turbine bypass valve is set fully open and a boost pressure is controlled by a low-pressure turbine bypass valve.

12. The method according to claim 10, wherein the first control mode is a high-speed/torque control mode and in the second control mode a low-pressure turbine bypass valve is set fully closed and a boost pressure is controlled by a high-pressure turbine bypass valve.

13. A method of controlling a turbocharged engine via an electronic control unit including non-transitory instructions stored in memory, comprising:
   operating the turbocharged engine with sequentially arranged low-pressure and high-pressure turbochargers including a high-pressure compressor with a passive, sensorless compressor bypass valve (CBV);
   setting a high-pressure turbine bypass valve fully open and controlling boost pressure by a low-pressure turbine bypass valve responsive to CBV degradation at low-speed/torque; and
   setting the low-pressure turbine bypass valve fully closed and controlling boost pressure by the high-pressure turbine bypass valve responsive to CBV degradation at high-speed/torque.

14. The method of claim 1, wherein evaluating at least one sensor signal of the turbocharged engine for detecting the failure mode of the compressor bypass valve comprises evaluating a first sensor signal, engaging a first control mode if a condition associated with the first sensor signal is met, engaging a second control mode if the condition is not met, and evaluating a second sensor signal if the condition associated with the first sensor signal is not able to be determined.

15. The method of claim 14, wherein the first sensor signal comprises a sensor signal representative of intake mass airflow, and wherein the condition associated with the first sensor signal comprises the intake mass airflow being detected at a maximum value.

\* \* \* \* \*